(12) United States Patent
Mishra et al.

(10) Patent No.: US 8,588,244 B2
(45) Date of Patent: *Nov. 19, 2013

(54) CONFIGURABLE FAST ETHERNET AND GIGABIT ETHERNET DATA PORT

(75) Inventors: Shridhar Mubaraq Mishra, Berkley, CA (US); Tina Zhang, Singapore (SG); Chunfeng Hu, Singapore (SG); Hak Keong Sim, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 220 days.

This patent is subject to a terminal disclaimer.

(21) Appl. No.: 13/270,760

(22) Filed: Oct. 11, 2011

(65) Prior Publication Data

US 2012/0069848 A1 Mar. 22, 2012

Related U.S. Application Data (63) Continuation of application No. 10/526,990, filed as application No. PCT/SG02/00211 on Sep. 6, 2002, now Pat. No. 8,064,471.

(51) Int. Cl.
*H04L 12/28* (2006.01)

(52) U.S. Cl.
USPC .......................... 370/413; 370/419; 709/250

(58) Field of Classification Search
None
See application file for complete search history.

(56) References Cited

U.S. PATENT DOCUMENTS

| | | | |
|---|---|---|---|
| 5,233,603 A | 8/1993 | Takeuchi et al. | |
| 6,034,957 A | 3/2000 | Haddock et al. | |
| 6,104,696 A | 8/2000 | Kadambi et al. | |
| 6,226,292 B1 | 5/2001 | DiPlacido | |
| 6,246,680 B1 | 6/2001 | Muller et al. | |
| 6,356,951 B1 | 3/2002 | Gentry, Jr. | |
| 6,724,759 B1 | 4/2004 | Chang et al. | |
| 6,731,631 B1 | 5/2004 | Chang et al. | |
| 7,099,276 B1 | 8/2006 | Kalkunte et al. | |
| 7,145,866 B1 | 12/2006 | Ting et al. | |
| 7,433,302 B2 * | 10/2008 | Allen ........................ | 709/250 |
| 7,616,662 B2 * | 11/2009 | Mishra et al. ............... | 370/474 |
| 8,064,471 B2 * | 11/2011 | Mishra et al. ............... | 370/413 |
| 2001/0043611 A1 | 11/2001 | Kadambi et al. | |
| 2001/0050912 A1 | 12/2001 | Malalur et al. | |
| 2002/0009083 A1 | 1/2002 | Ambe et al. | |
| 2002/0027888 A1 | 3/2002 | Creigh | |
| 2002/0071398 A1 | 6/2002 | Moran et al. | |
| 2002/0093974 A1 | 7/2002 | Kadambi et al. | |
| 2003/0212815 A1 | 11/2003 | Tzeng et al. | |
| 2005/0256821 A1 * | 11/2005 | Mishra et al. .................... | 707/1 |
| 2005/0265358 A1 * | 12/2005 | Mishra et al. ............... | 370/400 |

OTHER PUBLICATIONS

International Search Report Dated Jul. 8, 2003 for Application No. PCT/SG02/00211. 3 Pages.

(Continued)

*Primary Examiner* — Jeffrey M Rutkowski
(74) *Attorney, Agent, or Firm* — Eschweller & Associates, LLC (57) ABSTRACT

An Ethernet switch has at least one ingress/egress port which is operable in two modes, in a first mode as a GE port and in a second mode as a plurality of FE ports. The port has 8 MAC interfaces each of which is capable of receiving/transmitting FE packets, and at least one of the MAC interfaces can be configured to receive/transmit GE packets. Thus, the port has two modes of operation. The port further includes receive and transmit modules which receive GE and FE packets from, and transmit GE and FE packets to, the interfaces.

21 Claims, 5 Drawing Sheets

(56) References Cited

OTHER PUBLICATIONS

"Etherfast 10/100/1000 8 Port Giga Switch," LINKSYS User Guide, XP002244154, www.linksys.com.
Non-Final Office Action dated Nov. 27, 2007 for U.S. Appl. No. 10/526,990. 10 Pages.
Final Office Action dated May 29, 2008 for U.S. Appl. No. 10/526,990. 9 Pages.
Non-Final Office Action dated Jan. 5, 2009 for U.S. Appl. No. 10/526,990. 9 Pages.
Non-Final Office Action dated Jun. 23, 2009 for U.S. Appl. No. 10/526,990. 9 Pages.
Non-Final Office Action dated Apr. 26, 2010 for U.S. Appl. No. 10/526,990. 13 Pages.
Final Office Action dated Sep. 30, 2010 for U.S. Appl. No. 10/526,990. 15 Pages.
Non-Final Office Action dated Feb. 14, 2011 for U.S. Appl. No. 10/526,990. 11 Pages.
Notice of Allowance dated Jul. 15, 2011 for U.S. Appl. No. 10/526,990. 8 Pages.

\* cited by examiner

CONFIGURABLE FAST ETHERNET AND GIGABIT ETHERNET DATA PORT

RELATED APPLICATIONS

This application is a continuation application of U.S. application Ser. No. 10/526,990, filed Mar. 7, 2005, which claims priority to International Application No. PCT/SG02/00211, filed Sep. 6, 2002.

FIELD OF INVENTION

The present invention relates to a data port, such as an ingress/egress data port of an Ethernet switch, which is configurable to operate in one of multiple modes.

BACKGROUND

A gradual shift is occurring from Fast Ethernet (FE) systems to Gigabit Ethernet (GE) systems. This, and the use of Ethernet in First Mile (EFM), makes it advantageous to provide a configurable Ethernet switch which can function both as a Fast Ethernet and as a Gigabit Ethernet switch, in order to facilitate the transition from FE to GE Ethernet.

SUMMARY

In general terms, the present invention proposes that an ingress/egress port is operable in two modes, in a first mode as a GE port and in a second mode as a plurality of FE ports. The port includes a plurality of MAC interfaces each of which is capable of receiving/transmitting FE packets. At least one of the MAC interfaces is further configurable to receive GE packets. The port further includes receive and transmit modules which are configurable respectively to receive both GE and FE packets from, and transmit GE and FE packets to, the interfaces.

Preferably, there is only a single MAC interface which is configurable to receive/transmit either GE or FE packets, and the other MAC interfaces are only adapted to receive/transmit FE packets. Typically, there are 8 MAC interfaces per port.

Preferably, the MAC interfaces are each associated with a buffer, so that, as packets are received by the interfaces they are stored. Packets may arrive concurrently on all FE ports and are stored in individual buffers. The buffers are polled sequentially by the receive module.

Preferably, there are a plurality of such ports in the Ethernet switch. For example, if there are 8 such ports, then by switching different numbers of the ports between the two modes, the switch may operate in 9 different modes: as 8 GE ports, 7 GE ports and 8 FE ports, . . . , 2 GE ports and 48 FE ports, 1 GE port and 56 FE ports, or simply as 64 FE ports.

BRIEF DESCRIPTION OF THE DRAWINGS

Preferred features of the invention will now be described, for the sake of illustration only, with reference to the following figures in which.

DETAILED DESCRIPTION

Figure 1:
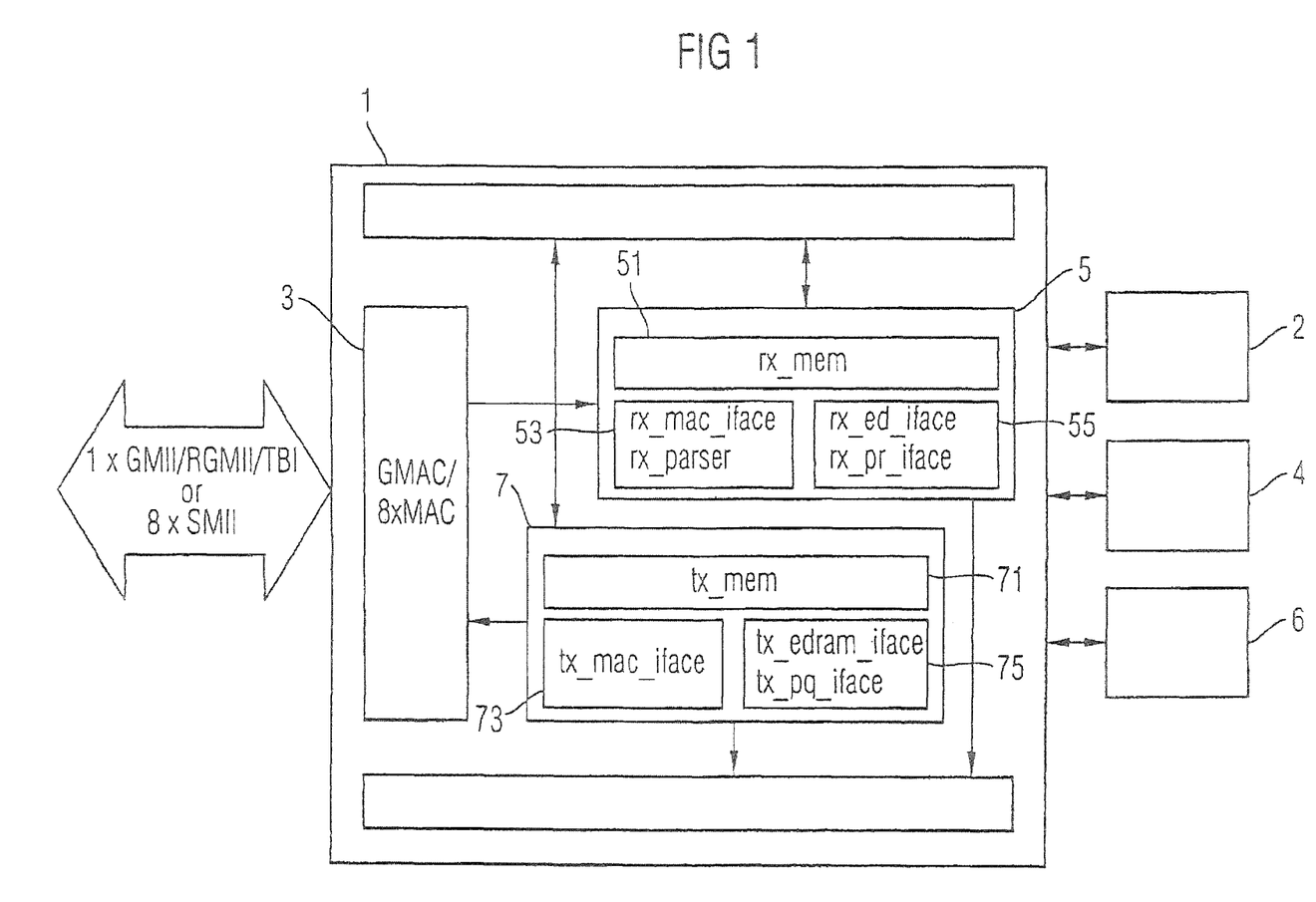
FIG. 1 shows schematically a configurable Ethernet port which is an embodiment of the invention.

Referring firstly to FIG. 1, a configurable Ethernet port 1 according to the invention comprises an interface 3 having the appropriate number of pins to function as 8 FE MAC interfaces. These are pins are partitioned into 8 sets of pins. One of sets of pins can function as an interface for GE packets, since such a packets requires the same number of pins as an FE packet. The interface 3 receives/transmits GE packets (e.g. in the GMII, RGMII or TBI formats) from/to the left of the figure. The interface 3 transmits received packets to a receive module 5, and transmits to the left of the figure packets received from a transmit module 7.

The receive module 5 is shown including the following major sections: a memory 51 rx_mem; a 53 section having an interface rx_max_iface for extracting the Ethernet header from incoming data packets and putting it into a descriptor, and for putting data from incoming packets into cells, and a parser rx_parser for extracting information from other headers in the packet, and adding this information also to the descriptor; and a section 55 having a first interface ax_ed_iface and a second interface rx_pr_iface The Ethernet port 1 further includes a transmit module 7, shown having the following major sections: a memory TX_MEM 71; a TX_MAC_IFACE 73; and a section 75 including a tx_edram_iface and a tx_pq_iface.

The receive module 5 communicates with a packet resolution module 2 and an embedded DRAM (eDRAM) 4. The transmit module 7 communicates with the embedded DRAM 4 and a queue/packet manager 6.

The Ethernet port 1 further includes an interface 9 to the CPU, and MIB (management information base) counters 11. These counters count various packet types, e.g. the number of 64 byte packets.

Figure 2:
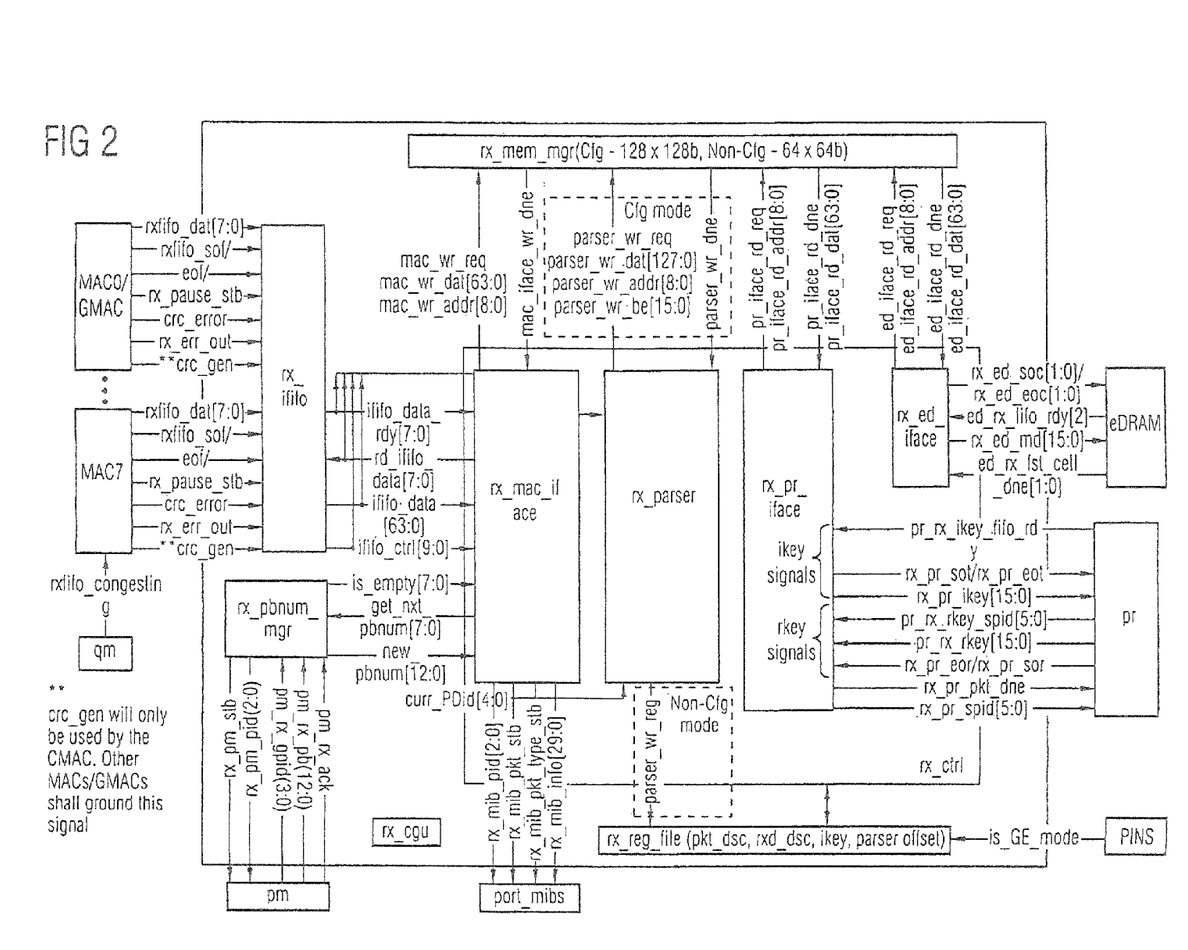
FIG. 2 shows the architecture of the receive module of FIG. 1.
Figure 3:
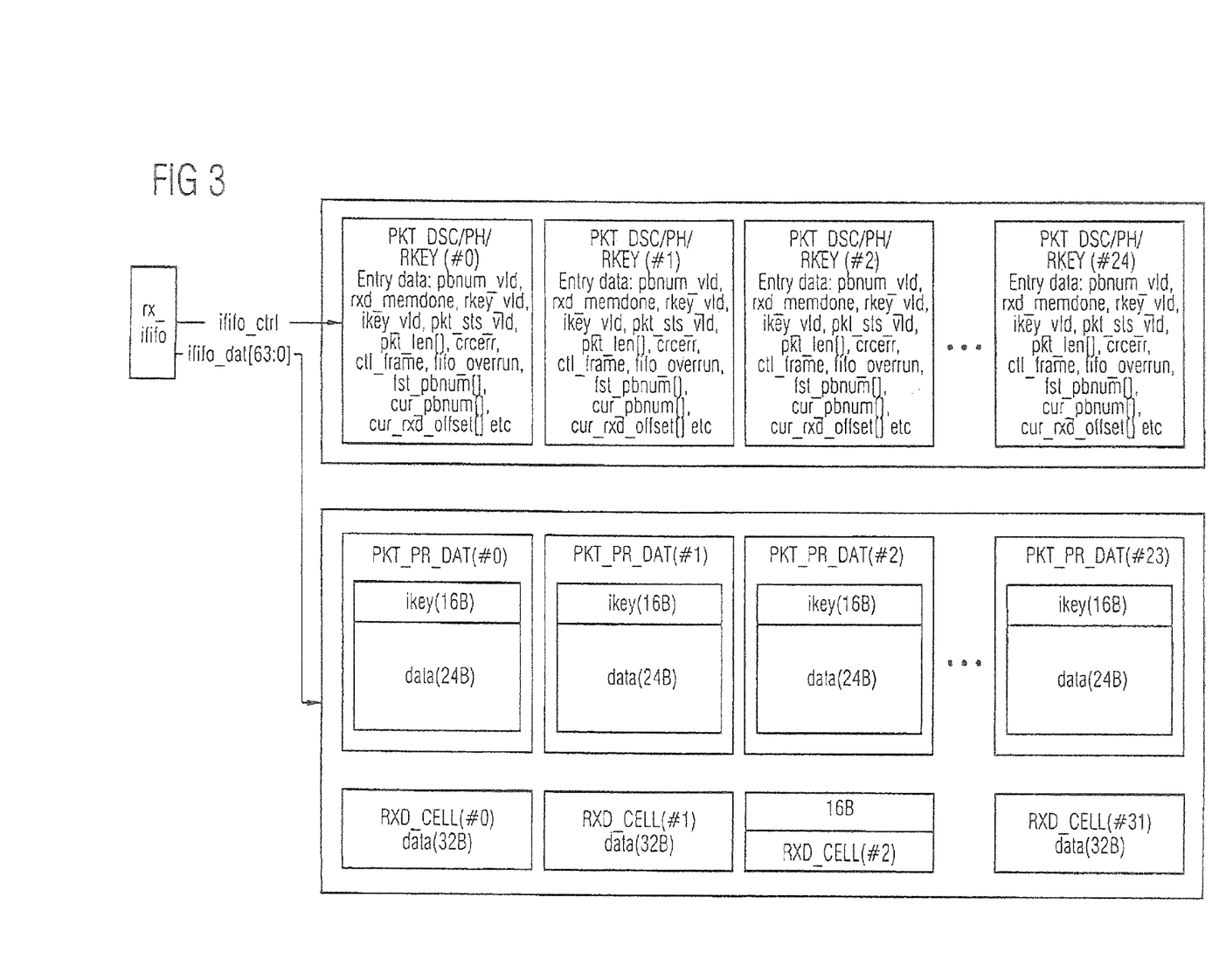
FIG. 3 shows the concept of storage within the receive module of FIG. 2.

The structure of the RX module 5 is shown in more detail in FIG. 2. The basic data/control flow of the RX module is as follows:

1. A set of first-in-first-out input buffers rx_ifofo receives and stores incoming packets and handles the interface to the MACS 3.
2. rx_ifofo informs the receive MAC interface rx_mac_iface when data is ready.
3. The interface rx_mac_iface fetches data from rx_ififo and stores it in the memory rx_mem_mgr. For each packet fetched by rx_max_iface, a respective packet descriptor (PKT_DSC) is allocated to the packet. The packet descriptor contains status information about the incoming packet (control information received from IFIFO/Current packet number etc). This packet descriptor is allocated to an incoming packet and only de-allocated when the entire packet has been written to the memory. Packet descriptors are located within the register file rx_reg_file. Rx_reg.file and rx_mem_mgr are part of rx_mem in FIG. 1. In all 24 packet descriptors are available. Thus, in FE mode, 3 packet descriptors are available per FE port. The packet descriptor is shown in the top line of FIG. 3, as PKT_DSC/PH/RKEY(#0) etc.
4. The first 24 bytes of each frame are stored within a separate memory bank PKT_PR_DATA also within RX_MEM to be sent to the packet resolution module 2. This is illustrated in FIG. 3, which shows that there are sections of this memory (numbered PKT_PR_DAT(#0) to PKT_PR_DAT(#23)), i.e. one corresponding to each packet descriptor. These 24 bytes are the last to be sent to the eDRAM 4 along with the packet header (PH). After the first 24 bytes, each 32 byte chunk is stored in a separate 32 byte memory cell (RXD_CELL). These cells are allocated to the incoming data in a round-robin fashion. Cells are freed when the corresponding data has been written to the eDRAM. In all 32 memory cells RXD_CELL are available, i.e. 4 per FE port. In FIG. 3 allocation is shown for a 104 byte frame, which is placed into the region of FIG. 3 which is shown shaded. As mentioned above, the first 24 bytes are stored in the memory section PKT_PR_DATA#0 while the remaining 80 bytes is stored in 3 memory cells (RXD_CELL#0, RXD_CELL#1 and RXD_CELL#02), leaving the third memory cell RXD_CELL#2.

5. Incoming data is analysed by the RX parser rx_parser, which extracts eight 2-byte items, called IKEY, per packet. These 2-byte items are written to the first 16 bytes of PKT_PR_DATA. The extraction is performed based on the offsets programmed in the 8 Offset registers of a register file. The rx-parset also determines whether a frame is VLAN tagged and/or SNAPped. The VLAN tag and priority are also extracted if present. This information is sent to the PR module 2 along with the IKEY and first 16 bytes of 24 bytes of data.

6. Once the entire packet has been received from rx_ififo, and the RX parser rx_parser has written IKEY into PKT_PR_DATA, the RX packet resolution interface (rx_pr_iface) sends IKEY and the data to the packet resolution module 2, provided that the packet resolution module 2 is ready to receive it.

7. The eDRAM interface (rx_edram_iface) of the receive module 5 sends each complete RXD_CELL to the eDRAM 4 in 17 cycle bursts.

8. Data is written to the eDRAM 4 in 32 byte bursts, giving a bandwidth of 256 bits. Each of these 32 byte bursts (a total of 256 bytes) can be referenced by a single packet number called pbnum. The receive module 5 further includes a packet number manager (rx_pbnum_mgr) which maintains a queue of 3 packet numbers per FE port, or 24 for the GE port. The packet numbers are provided to the rx_max_iface when requested by the pm module of FIG. 2.

Figure 4:
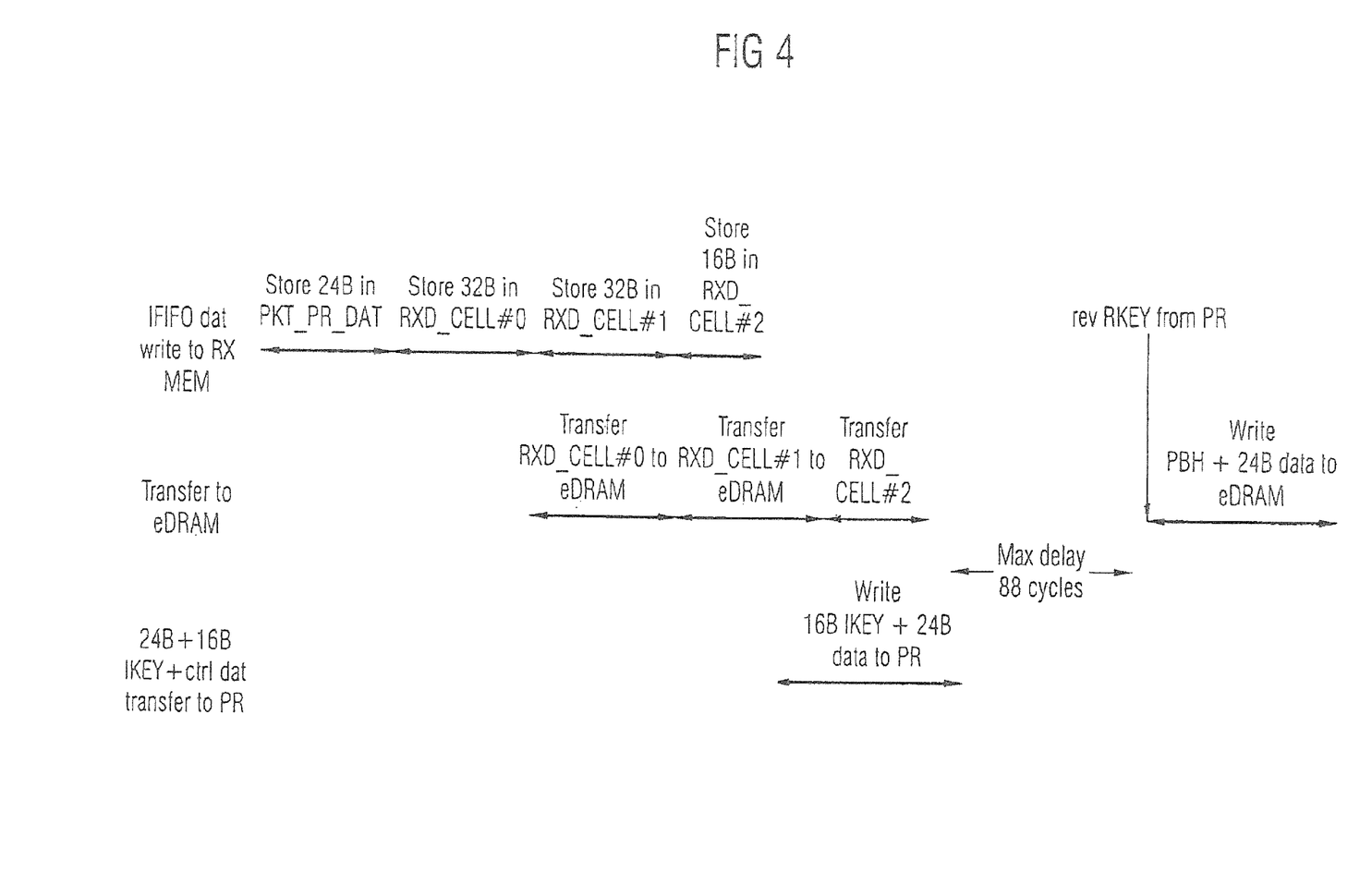
FIG. 4 shows a timechart showing how the receive module of FIG. 2 processes a packet.

The timechart of FIG. 4 is a timechart showing the operation described above, with time flowing from left to right. The top line shows how the rx_ififo writes data to the memory RX_MEM 51. The middle line shows the transfer of data to the eDRAM. The lowest line shows how IKEY, the 16 bytes of data and control data (selected from PKT_DSC) is written to the packet resolution module. The transfer of the packet header and 24 bytes of data to the eDRAM 4 occurs upon receiving a signal revRKEY from the packet resolution module 2.

The above scheme is not altered fundamentally when the switch occurs between GE and FE. The changes are that the amount of data is larger in GE, so that more of the memory cells RXD_CELLs are used are used per packet, and that the parsing is different.

If the delay is longer than 88 cycles, only the performance is impacted. Packets stay longer in the RX. If this trend continues then eventually all PCT_DCC will be occupied.

Figure 5:
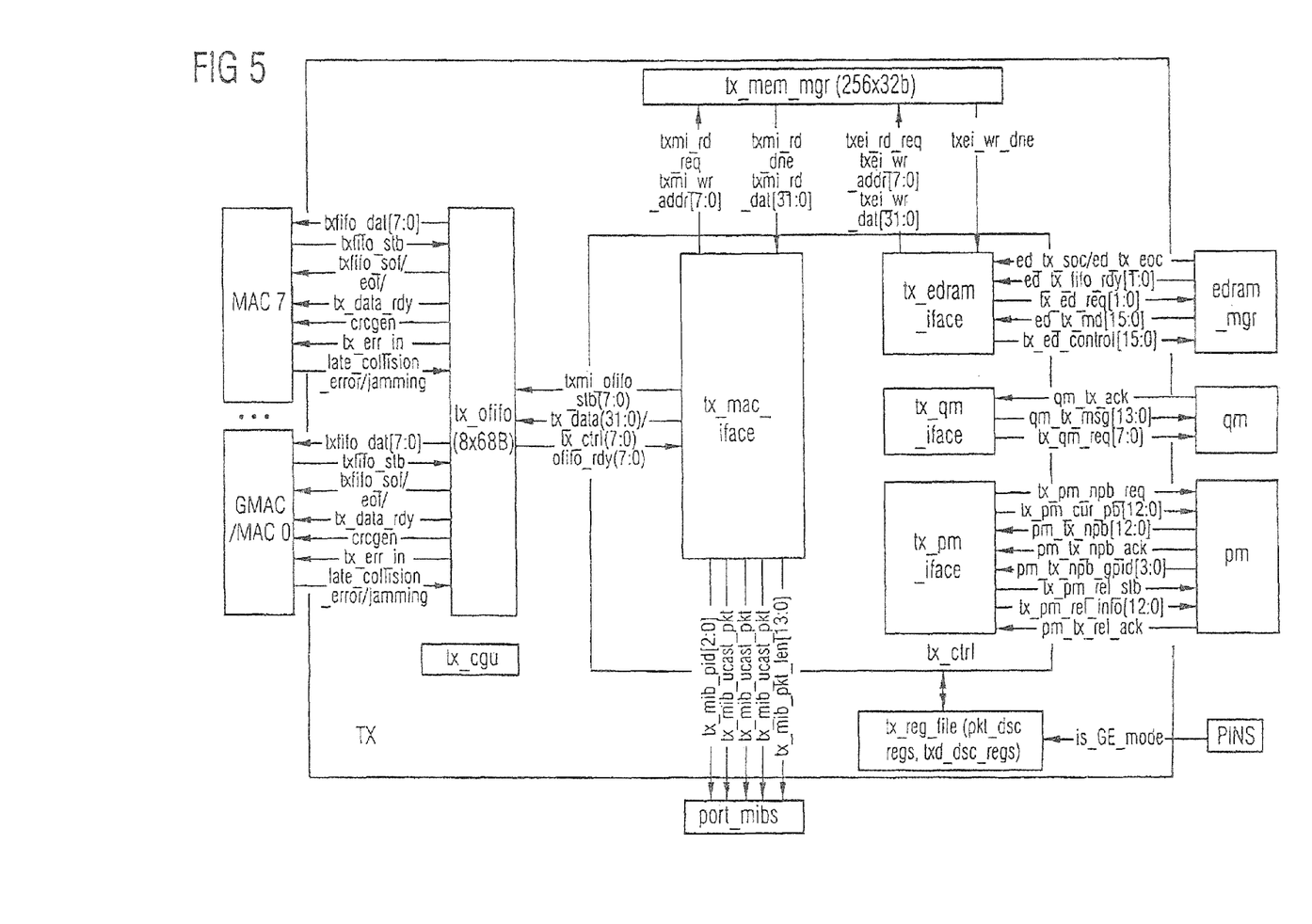
FIG. 5 shows the architecture of the transmit module of FIG. 1.

Turning now to FIG. 5, the structure of the TX module 7 is shown, having a large degree of symmetry with the structure of he RX module 5, such that corresponding items are given similar labels in FIG. 5. The queue/packet manager 6 of FIG. 1 is shown in FIG. 5 as a packet manager pm and a queue manager qm. The steps in the operation of this module are as follows:

1. New packets be transmitted through the interface 3 are fetched from the queue manager qm by an interface tx_qm_iface whenever at least one packet descriptor is available.

2. For each packet fetched by the interface tx qm_iface, a packet descriptor PKT_DSC is allocated within tx reg_file. This packet descriptor is allocated to an outgoing packet and is only de-allocated when the entire packet has been sent to the output first-in-first-out buffer interface tx_ofifo, and the packet released from the packet manager pm. The packet descriptor PKT_DSC contains information for each packet which is required for:

Accessing data from the eDRAM 4 (the first pbnum and current pbnum).

Sending data to tx_ofifo (ready for transmission, current offset in TXD_CELL, etc).

Receiving packets from the packet manager pm (ready for release, etc).

Basic buffer allocation (entry assigned, etc).

Unlike in the receive module 5, the storage of a frame within tx_mem_mgr is uniform with all data being stored in 32 byte cells called TXD_CELLs. There are 24 packet descriptors and 36 TXD cells. When the Ethernet port 1 is configured as 8 FE ports, all packet descriptors PKT_DSCs and TXD_CELLs are divided equally among all the FE ports.

3. The eDRAM interface tx_ed_iface requests data from the eDRAM 4 via individual request strobes tx_ed_req(1:0). Requests to the eDRAM 4 for a single packet are always in sequence. However, due to differences in instantaneous loads on two different banks of the eDRAM 4, data may be delivered out-of-order. Data is transferred in 17 cycle bursts.

4. Once a packet is ready for transmission, the interface tx_mac_iface informs the tx_ofifo that data is ready for the corresponding port. This is sent when the entire packet or 128 bytes (whichever is lower) has been received from eDRAM.

5. Once a packet has been received from the memory (eDRAM 4), tx_ed_iface sets a ready for release bit (rdy4rel) in the corresponding packet descriptor PKT_DSC. Release requests are then sent to the packet manager pm.

6. The tx_mac_iface interface transfers the data from tx_mem_mgr to the output interface tx_ofifo when the corresponding MAC of interface 1 is ready to receive the data. The tx_ofifo manages the actual interaction with each FE MAC, or the single GE MAC. In the FE case, storage within the output interface tx_ofifo is divided equally between all the FE ports.

Again, the above scheme is hardly varied as between the GE and FE cases. The RX and TX interfaces know which type of packets they are to handle from data received as PINS signals shown in FIG. 2.

What is claimed is:

1. An ingress/egress port for an Ethernet switch comprising:
   a plurality of Media Access Control (MAC) interfaces, wherein at least one MAC interface is configured to receive/transmit Fast Ethernet (FE) packets, at least one of the MAC interfaces further being configured to receive/transmit Gigabit Ethernet (GE) packets independent of the other plurality of MAC interfaces;
   a receive module and a transmit module, which are configured respectively to receive both GE and FE packets from, and transmit both GE and FE packets to, all the MAC interfaces; and wherein the ingress/egress port operates as a single GE physical port in a first mode of operation and as more than one FE physical port in a second mode of operation; and wherein at least one MAC interface is associated with a separate buffer configured to store packets as they are received at the respective MAC interface, the receive module being arranged to receive packets from the respective buffers sequentially.

2. The ingress/egress port according to claim 1, wherein only one of the MAC interfaces is configured to receive/transmit both GE and FE packets, the other MAC interfaces only being adapted to receive/transmit FE packets.

3. The ingress/egress port according to claim 2, wherein the receive module receives the FE packets sequentially even if FE packets actually reach different ones of the MAC interfaces simultaneously.

4. The ingress/egress port according to claim 1, wherein the receive module receives the FE packets sequentially even if FE packets actually reach different ones of the MAC interfaces simultaneously.

5. The ingress/egress port according to claim 1, wherein the receive module further includes a memory configured to store packet data, and a receiver interface configured to extract header data from the packet data and generate a descriptor therefrom, the descriptor associated with the packet data within the receive module.

6. The ingress/egress port according to claim 5, wherein the receive module further comprises a set of buffers configured to receive packets from at least one of the MAC interfaces, and wherein the receiver interface is further configured to fetch packet data from the set of buffers and store the packet data in the memory.

7. The ingress/egress port according to claim 6, wherein at least one buffer of the set of buffers comprises a first-in-first-out buffer.

8. The ingress/egress port according to claim 6, wherein the receiver interface is further configured to store the descriptor associated with the packet data in the memory.

9. The ingress/egress port according to claim 1, wherein the plurality of MAC interfaces consists of 8 MAC interfaces.

10. The ingress/egress port according to claim 7, the receive module further comprising:
a parser for extracting information from headers in the received packets, and adding this information to the descriptor.

11. The ingress/egress port according to claim 10,
wherein the receive parser is configured to extract eight 2-byte items from at least one received data packet, wherein the 2-byte items are written to the first 16 bytes of a memory bank, and
wherein the extraction is performed based upon offsets programmed into offset registers of a register file.

12. The ingress/egress port according to claim 1, the receive module further comprising:
a memory configured to store packet data, and a receiver interface configured to extract header data from the packet data and generate a descriptor therefrom, the descriptor associated with the packet data within the receive module;
a parser for extracting information from headers in the received packets, and adding this information to the descriptor, wherein the receive parser is configured to extract eight 2-byte items from at least one received data packet, wherein the 2-byte items are written to the first 16 bytes of a memory bank, and wherein the extraction is performed based upon offsets programmed into offset registers of a register file.

13. An Ethernet switch comprising:
at least one ingress/egress port, wherein at least one ingress/egress port having
a plurality of Media Access Control (MAC) interfaces, wherein at least one MAC interface
is configured to receive/transmit Fast Ethernet (FE) packets, at least one of the MAC interfaces further being configured to receive/transmit Gigabit Ethernet (GE) packets independent of the other plurality of MAC interfaces;
a receive module and a transmit module, which are configured respectively to receive both GE and FE packets from, and transmit both GE and FE packets to, all the MAC interfaces; and
wherein the ingress/egress port operates as a single GE physical port in a first mode of operation and as more than one FE physical port in a second mode of operation; and
wherein at least one MAC interface is associated with a separate buffer configured to store packets as they are received at the respective MAC interface, the receive module being arranged to receive packets from the respective buffers sequentially.

14. The Ethernet switch according to claim 13, wherein the at least one ingress/egress port comprises eight ingress/egress ports, at least one ingress/egress port being configured to switch between a first mode and a second mode, in which at least one ingress/egress port operates as a single GE physical port in the first mode and as eight FE physical ports in the second mode and wherein the switch can operate as n GE ports and 8(8-n) FE ports for n a selectable integer in the range 0 and 8.

15. The Ethernet switch according to claim 13, wherein the receive module further includes a memory configured to store packet data, and a receiver interface configured to extract header data from the packet data and generate a descriptor therefrom, the descriptor associated with the packet data within the receive module.

16. The Ethernet switch according to claim 15, wherein the receive module further comprises a set of buffers configured to receive packets from at least one of the MAC interfaces, and wherein the receiver interface is further configured to fetch packet data from the set of buffers and store the packet data in the memory.

17. The Ethernet switch according to claim 16, wherein at least one buffer of the set of buffers comprises a first-in-first-out buffer.

18. The Ethernet switch according to claim 16, wherein the receiver interface is further configured to store the descriptor associated with the packet data in the memory.

19. A method, comprising
providing data packets to an ingress/egress port of an Ethernet switch, ingress/egress port having a plurality of Media Access Control (MAC) interfaces, wherein at least one MAC interface is configured for receiving/transmitting Fast Ethernet (FE) packets, at least one of the MAC interfaces further being configured to receive/transmit Gigabit Ethernet (GE) packets independent of the other plurality of MAC interfaces;
storing the data packets in buffers associated with the plurality of MAC interfaces, at least one MAC interface being associated with a separate buffer;

passing packet data from the data packets from the buffers to a receive module, the receive module configured to receive both GE and FE packets from all the MAC interfaces;

passing outgoing packet data from a transmit module to the MAC interfaces, the transmit module configured to transmit both GE and FE packets to all the MAC interfaces; and switching the ingress/egress port between a first mode and a second mode, in which the ingress/egress port operates as a single GE physical port in the first mode and as more than one FE physical port in the second mode.

20. The method according to claim 19, further comprising providing a control signal to determine whether the MAC interfaces operate as FE interfaces or whether the at least one MAC interface operates as a GE interface.

21. An ingress/egress port for an Ethernet switch, the ingress/egress port comprising:

a plurality of Media Access Control (MAC) interfaces, at least one MAC interface being configured to receive/transmit Fast Ethernet (FE) packets, at least one of the MAC interfaces further being configured to receive/transmit Gigabit Ethernet (GE) packets;

a receive module and a transmit module, which are configured respectively to receive both GE and FE packets from, and transmit both GE and FE packets to, all the MAC interfaces; and a switch configured to switch the ingress/egress port between a first mode and a second mode of operation for the ingress/egress port, wherein the ingress/egress port operates as a single GE physical port in the first mode of operation using the at least one of the MAC interfaces to transmit and receive GE packets and as more than one FE physical port in the second mode of operation using the plurality of MAC interfaces to transmit and receive FE packets.

* * * * *